(12) United States Patent
Walz et al.

(10) Patent No.: US 6,550,669 B1
(45) Date of Patent: Apr. 22, 2003

(54) INTEGRAL HEATING NOZZLE AND PICKUP TUBE

(75) Inventors: Mark J. Walz, Northborough, MA (US); John O'Neil, Merrimack, NH (US)

(73) Assignee: Genrad, Inc., Westford, MA (US)

( * ) Notice: Subject to any disclaimer, the term of this patent is extended or adjusted under 35 U.S.C. 154(b) by 0 days.

(21) Appl. No.: 09/970,911

(22) Filed: Oct. 4, 2001

(51) Int. Cl.[7] .............................................. B23K 3/04
(52) U.S. Cl. ..................... 228/264; 228/191; 228/19; 228/20.1; 228/6.2
(58) Field of Search ..................... 228/6.2, 19, 20.1, 228/20.5, 51, 119, 191, 264

(56) References Cited

U.S. PATENT DOCUMENTS

| | | | |
|---|---|---|---|
| 4,274,576 A | * | 6/1981 | Shariff ........................ 228/264 |
| 4,295,596 A | * | 10/1981 | Doten et al. ............ 228/180.21 |
| 4,752,025 A | * | 6/1988 | Stach et al. ...................... 228/9 |
| 4,767,047 A | * | 8/1988 | Todd et al. .................. 228/6.2 |
| 4,914,513 A | | 4/1990 | Spigarelli et al. |
| 5,251,266 A | | 10/1993 | Spigarelli et al. |
| 5,419,481 A | | 5/1995 | Lasto et al. |
| 5,579,979 A | | 12/1996 | Kurpiela |
| 5,598,965 A | * | 2/1997 | Scheu ......................... 228/6.2 |
| 5,785,237 A | * | 7/1998 | Lasto et al. ............ 228/180.22 |
| 6,043,458 A | * | 3/2000 | Fortune ....................... 219/230 |

* cited by examiner

Primary Examiner—M. Alexandra Elve
Assistant Examiner—Len Tran
(74) Attorney, Agent, or Firm—Cesari and McKenna, LLP; Edwin H. Paul, Esq.

(57) ABSTRACT

An integral heating nozzle and a syringe needle pickup vacuum tube where the nozzle moves relative to the pickup tube, FIG. 4, and where the nozzle does not move relative to the pickup tip, FIG. 1. The relative movement allows the heating gas to be directed to the solder connections while the vacuum tube may be independently moved so as to attach to the component body for removal and replacement, even when the component body is small and of different contours. In both cases the nozzle size allows components of cross section 0.01×0.01 inch to 0.05×0.05 inch to bereplaced. The opening of the nozzle accommodates removing and placing these smaller components through the nozzle. In some embodiments helium rather than air or nitrogen is used as a heating gas.

10 Claims, 4 Drawing Sheets

INTEGRAL HEATING NOZZLE AND PICKUP TUBE

BACKGROUND OF THE INVENTION

1. Field of the Invention

The present invention relates heating nozzles integral with a vacuum pickup tube for soldering and unsoldering electronic components to and from printed circuit boards (PCBs), and more particularly to such nozzle-pickup and placement devices for very small electronic components.

2. Background Information

Repair of components mounted onto PCBs typically requires solder reflow and removal of the defective components, followed by precision placement and solder reflow for installation of replacement components. The electronic industry has developed a myriad of different electronic and electrical components that has made repair more difficult. Generally the components, both active and passive, have become much smaller, and the packaging of very large scale integration (LSI) chips has made many solder joints relatively inaccessible for repair.

Many LSI chip packages have solder joints beneath large square or rectangular chip packages, e.g. Ball Grid Arrays (BGA) and J leaded devices. Other LSI packages include large chip packages with peripheral gull wing leads.

In response, the repair industry has developed some specialized soldering/desoldering devices for these LSI packages. For example, U.S. Pat. No. 5,419481, to Lasto et al. describes a device specifically adapted for the BGA packages, and U.S. Pat. No. 5,579,979, to Kurpiela describes a device specifically adapted for the Gull Wing package. Both of these inventions feature square nozzles with a center suction device and means to direct hot air to the solder connections on the underneath for a BGA and J leaded packages and to the periphery for the Gull Wing. The U.S. Pat. No. 5,579,979 invention includes an additional contact heating element.

Both of these patented inventions have fixed mechanical designs for the locations of the heated areas and the vacuum pickup since these are designs pointed at specific packages. Inherently these devices are not effective when used to repair small components or components of different shapes and contours. For example, the above referenced patented devices have a fixed mechanical relationship between the suction cup end of the pickup tube and the shroud surrounding the tube that defines the heated locations. Obviously, if the suction cup is not close enough or touching the package it will not hold the package for removal, or if the suction cup is moved closer, the hot airflow will be blocked from heating the very small component solder connections.

Other repair devices use vacuum pickup tubes of 3/16 and 1/4 inch outside diameters which can be effectively used for larger components, but when applied to smaller components the larger tubes interfere with adjacent components limiting the effective use of these devices.

However, along with the development of the larger chip packages there has been a parallel development of smaller active and passive devices, often single electronic devices, where the size has become very small, e.g. 0.010"×0.020" in cross section. Moreover, the components themselves often have different shapes, and are densely populated on PCBs. The above described heating and pickup devices are not effective repairing these smaller components or larger, differently shaped components, and repair of such components remains a continuing problem.

SUMMARY OF THE INVENTION

The present invention addresses the limitations of the above described devices while providing other advantages as described below.

A soldering/desoldering and pickup/placement device for repairing components is described with a nozzle with an entrance through which heated gas enters and a second end shaped to focus and vent the heated gas onto the solder connections of components to be replaced. The nozzle is attached, and a preferred embodiment, to a plate that is positioned above the defective component and a hollow center syringe needle that is arranged to move vertically within the second end of the nozzle. A vacuum source is connected to a distal end of the hollow center and the proximate end terminates with the hollow center opening arranged to intimately contact the defective component to be repaired. Heated air, nitrogen, or helium is directed by the nozzle onto the soldered joints of the defective component, and, when the solder reflows, the vacuum operates to secure the component to be repaired to the proximate end of the syringe needle for removal. In a preferred embodiment, the syringe needle with the attached defective component may be raised through the nozzle or, in another preferred embodiment, the entire nozzle and defective component may be raised so that the defective component may be discarded. A replacement component can be attached to the proximate needle end and repositioned at the same location where the defective component was removed. The heated air then will melt the solder that reflows joining the new component to the PCB.

A mechanical system vertically moves the nozzle and syringe needle, but may also move the syringe needle with respect to the nozzle. The mechanism is arranged to position the proximate end of the syringe needle about centered in the nozzle opening and allows the needle end to move from a position before to a position beyond the second end of the nozzle. There may also be a "break-away" puff of gas pressure to break the contact between the syringe needle and the component. A vacuum sensor may also be used to detect when the component is in contact with the syringe needle. Force sensors are well known in the art and detects when the end of the syringe needle contacts the defective component on the PCB or when picking up the replacement component.

In some assemblies, the syringe needle is encompassed by a co-axial tube. Here the outer shape of the tube and the inner shape of the nozzle are arranged to focus the heated gas onto the soldered connections of the defective component.

In another embodiment, the nozzle is fixed to a mounting plate assembly that may be positioned with the nozzle above the PCB defective component. Here the nozzle opening is large enough to accommodate the defective component fitting through the nozzle's opening. In one preferred embodiment, the nozzle and the syringe needle and co-axial tube are connected as one assembly. In this case the PCB is roughly located by hand below the nozzle assembly, and, when the syringe needle and co-axial tube are vertically moved with respect to the PCB and the nozzle assembly, a floating washer between the nozzle and mounting plate assembly automatically seals the tube and the syringe needle with respect to the nozzle assembly when they are repositioned. The seal forces the heated gas to flow through the nozzle tip.

In another preferred embodiment, the second end of the nozzle has a transverse dimension of less than 0.25 inches, and where the syringe needle outside dimension is less than 0.01 to 0.05 inches.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
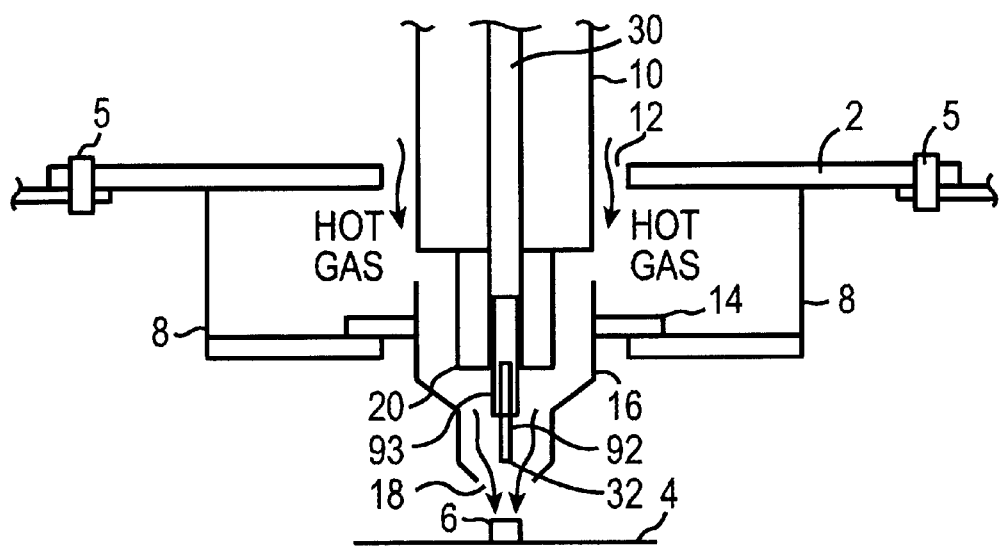
FIG. 1A is a section line drawing of an embodiment of the present invention.
Figure 1B:
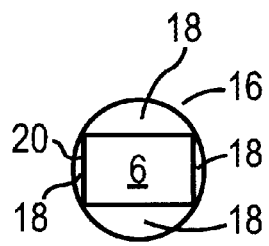
FIG. 1B is an end view of the nozzle.

FIG. 1A shows a system where the pick up syringe needle 32 and the heating nozzle (or funnel tip body) 16 are connected as an assembly that is moved independently from the mounting plate assembly, although the syringe needle may also be moved relative to the nozzle. The mounting plate assembly comprises a mounting plate 2 that is fixed in position by locating pins 5 and a housing 8 that is positioned above a PCB 4 directly over a soldered defective component 6 that is to be replaced. The PCB may be mechanically positioned by an operator in a location that will be directly below the mounting plate assembly. The PCB is movable transversely in the X-Y plane, as described later, allowing the defective component to be positioned accurately directly under the nozzle. The nozzle 16 is rotated as the pick-up tube 10 is rotated to perform a theta (θ) rotational alignment. The complete alignment includes the X, Y, and θ elements. The housing 8 is attached to the plate 2 forming a chamber around a pickup tube 10 that extends to a square end 20. The funnel tip body 16 is slightly out of round, or oval, but with a minor diameter that is slightly smaller that the diagonal of the square end 20 so that there is an interference fit of the funnel over the square end 20. The square end 20 is inserted into the oval funnel 16 and twisted to form a secure fit, as shown in FIG. 1B. An opening 12 between the plate and the tube allows heated gas to enter the chamber. The part of the chamber directly over the defective component has an opening with a floating washer 14 surrounding the opening, a funnel nozzle 16 in contact with the floating washer extends from the chamber opening ending with an opening 18 directly above the defective component 6. In another embodiment, the floating washer 14 may be replaced by a resilient, heat resistant fixed washer. Fibrous, cloth-like washers of mineral wool, alumina cloth mat or other similarly suitable materials may be used. The flexible nature of these materials enable sealing of the funnel 16 while permitting a fair degree of misalignment between the funnel 16 and the mounting plate assembly. The square end 20 and the funnel nozzle 16 are arranged so that the heated gas is directed onto the component and/or soldered connections of the defective component. All the soldered connections will be heated uniformly so that all the defective component's soldered joints are melted at about the same time ensuring that the component 6 can be lifted free of the soldered joints without damaging the PCB 4 itself.

Figure 1C:
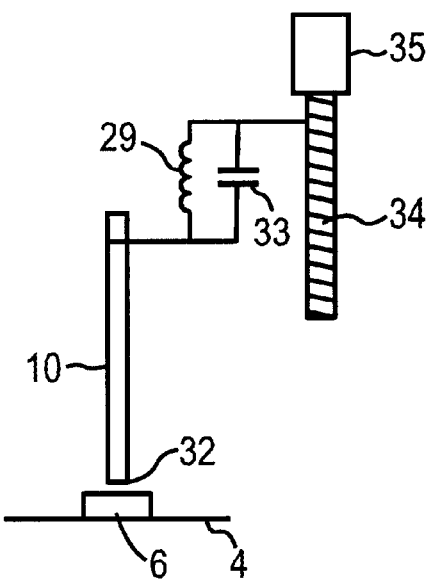
FIGS. 1C and 1D are diagrams of the force sensor switch mechanism.
Figure 1D:
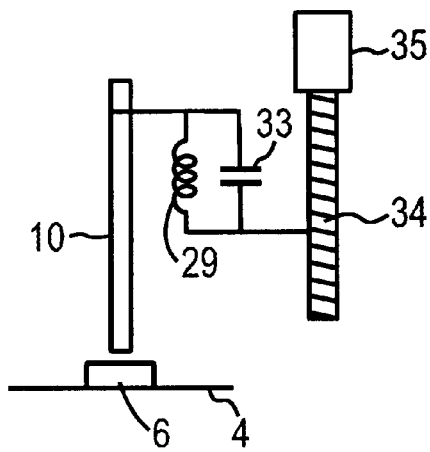

A syringe needle 92 is press fit into a micro-tube 93 with an end 32 arranged with a suction surface that accommodates the defective component that is press fit into the middle of the pick up tube 10. A force sensor detects when the needle tip touches the defective component. The sensor provides a signal for the operator. FIG. 1C illustrates an embodiment for this detection. A spring 29 that is under tension is adjusted so that minimal force causes the switch contact 33 to close as the drive screw 34 lowers the pick-up tube 10. When the pick-up tube tip 32 hits the top of the component 6 the spring compresses. The switch 33 closes and the closed switch is wired to stop the motor 35 when the contacts are closed. FIG. 1D is another embodiment using the spring 29 that is under compression. The spring is adjusted so that minimal force causes the switch 33 contacts to open as the drive screw 34 lowers the pick-up tube 10. When the pick-up tube 10 hits the component 6 the spring extends and opens the switch 33. The open switch 33 is wired to stop the motor 35.

Figure 2:
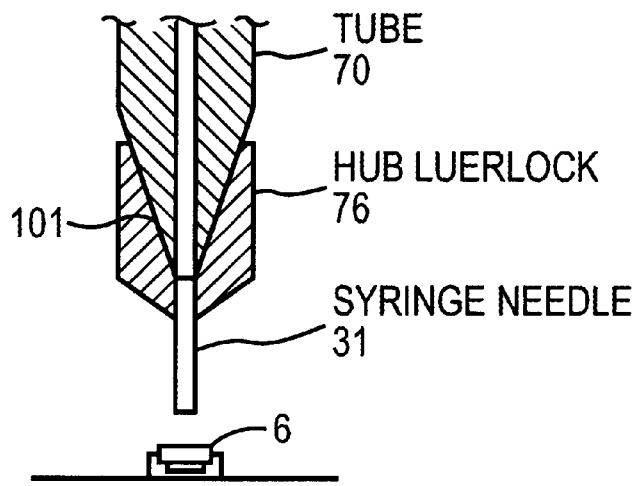
FIG. 2 is a section line drawing of the needle tube mounting.

With respect to FIG. 2, the syringe needle 31 is attached to a pick up tube 70 by a connecting hub that has a Luer lock taper 101. The Luer lock allows fast and simple interchanging of syringe needles. The hollow of the needle is evacuated and moved to contact the defective component 6. When the soldered joints are reflowed the needle is raised vertically carrying the defective component 6. This extraction can be timed from the start of the heated gas being directed onto the soldered joints, or a temperature sensor could be arranged that would signal when the soldered joints have become liquid.

Once the defective component 6 has been extracted, a replacement component may be held by vacuum to the syringe needle 31 and positioned to be soldered into the same location from where the defective component was removed. The new component is visually aligned by an operator. A magnifying optical assembly, discussed later, is positioned so that the operator can see the alignment of the leads to the pads on the PCB. The alignment of the component and the receiving pads on the PCB 4 may be accomplished, in a preferred embodiment, by moving the PCB transversely in the X-Y plane and by rotating the pick up tube 70 (which rotates the component). Alternatively the PCB may be rotated with respect to the nozzle for proper alignment of the component solder leads with the receiving pads on the PCB. As shown in FIG. 1A, the floating washer 14 design provides a self-aligning seal when the pickup tube 10 and the syringe needle 93 is raised to remove defective components 6 and lowered when replacing components. When the replacement component is properly positioned, the operator can lower the pick-up tube 10 and the component 6 onto the site of the PCB 4. After placing the component for reflow, and prior to retracting the pickup tube, a pulse of positive gas pressure is provided to the pickup tube in order to break the vacuum grip on the component 6. The pickup tube is raised 0.002 to 0.005 inches, the positive air pressure is shut off, and the pickup tube is retracted farther. This action breaks the vacuum in the syringe tube thereby releasing the component. Stopping the positive air flow prior to complete retraction of the pick-up tube prevents the very small, lightweight components from moving by the force of the positive air stream. The heated gas is now directed onto the component 6 and/or the solder connections to reflow the solder and attach the component to the PCB 4.

As shown and as discussed later the printed circuit board 4 is attached to an X-Y table which is controlled laterally. The heating funnel and the syringe vacuum tube are moved vertically and rotationally so that the component being replaced can be precisely aligned for removal and for replacement.

Figure 5:
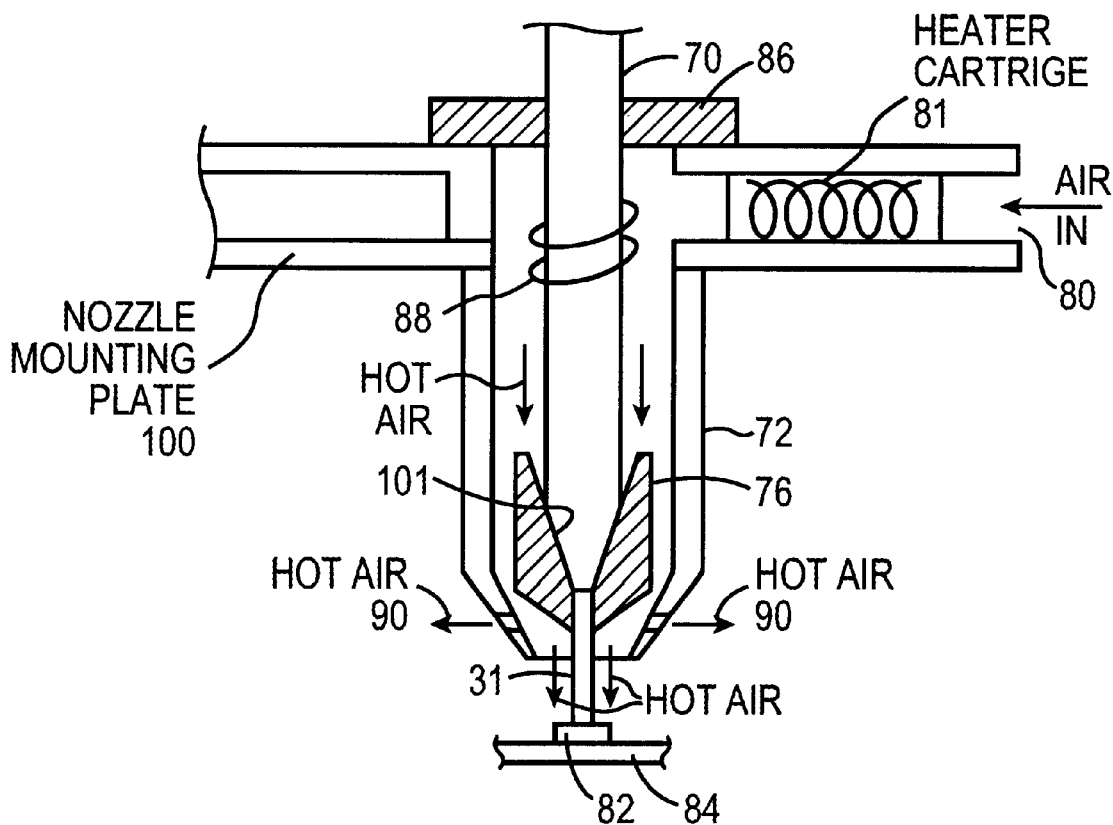
FIG. 5 is a sectioned line drawing of another embodiment of the invention.

With respect to FIG. 5, the syringe needle 31 size is selected to match the component 82 being reworked. The hollow diameter must be smaller that the surface portion of the component being reworked so that there are no leaks where the component surface and the hollow meet. At the same time the outside diameter of the syringe needle must be small enough to not interfere with the other adjacent components on the PCB. In addition, the wall thickness of the syringe needle must provide sufficient bearing surface area to provide a stable mounting surface to support the component normal to the axis of the syringe needle. Selecting the proper gage of syringe needle provides the strength and geometry to meet these requirements. Syringe needle wall thickness on the order of a few thousandths of an inch are common in such needles. The end of the hollow may have some small membrane or other such compliant surface that compensates for any small surface irregularities that might interfere with securely attaching the needle to the component. In addition, the syringe needle is designed to extend from before to beyond the end of the nozzle thereby allowing the inventive device the flexibility to be used with a wide variety of components.

Heated gas flows of 5 to 50 cubic feet per hour (SCFH) are small enough to prevent the gas flow from moving the component during heating. A balance is made among the gas flow rate, the temperature of the heater element (and thus the gas) that affects heater lifetime, and the rate of heat transfer to the solder connections of the component being replaced.

In a preferred embodiment, helium is used as the gas carrying heat to the solder connections. Helium has as much as five times the thermal conductivity and six or seven times the heat capacity as air and/or nitrogen. Since low air flow rates may be used, helium may be necessary to provide the required heat transfer rate to certain components.

FIG. 2 is a schematic line drawing showing the relative positions of the syringe needle 31 where it is joined to the tube 70. A Luer lock hub 76 with a 3.5 degree taper 101 is employed in this illustrative example where the pickup tube 70 also has a matching tapered end. The Luer lock hub allows the needle to be quickly replaced in order to accommodate other sized components and the needle is automatically aligned by the mating tapered surfaces of the Luer lock hub and the tube.

Figure 3:
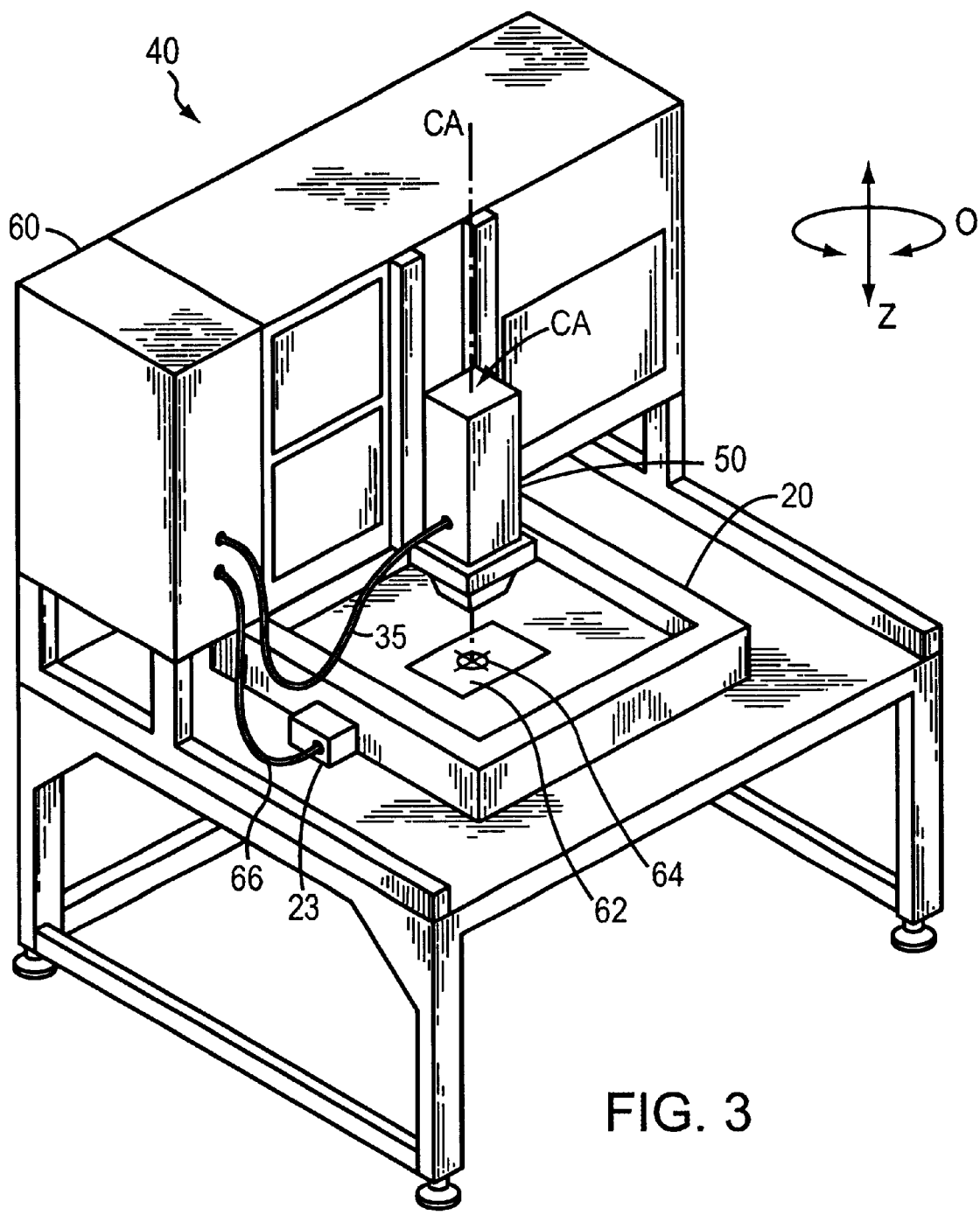
FIG. 3 is a diagram of the external connections and the mechanisms arranged for moving portions an embodiment of the invention.

FIG. 3 is a mechanical block diagram example of a repair station 40 with a guidance type placement apparatus that can be used to advantage with the present invention. The apparatus includes an X-Y plane table 28, a fixed placement head 50, and a master control subsystem 60. The components and descriptions below are generally described in U.S. Pat. No. 5,251,266 by Don Spigarelli. This patent is incorporated herein by reference. The techniques and components are briefly described below with the understanding that they may be implemented by those practitioners in the art. The X-Y table 28 is movable in the X and/or Y directions to position a component 64 on a printed circuit board 62 directly beneath the head 50. There is a drive mechanism 23, controlled from the control subsystem 60 via a cable 66 that moves the table 28 in the X and the Y directions. The printed circuit board is attached to the table by screws, clips and/or standoffs or other known means where the board 62 is secured to the X-Y table.

The head 50 controls rotationally, theta θ, and vertically, Z. The head 50 defines a center axis (CA) in the Z direction. Moving rotationally and vertically is accomplished by known means which may include stepping motors, analog/digital feedback control motors and other such mechanisms that are known the in the art. The electrical signals emanate from the control subsystem 60 via cable 35 to the control motors within the head 50.

Figure 4:
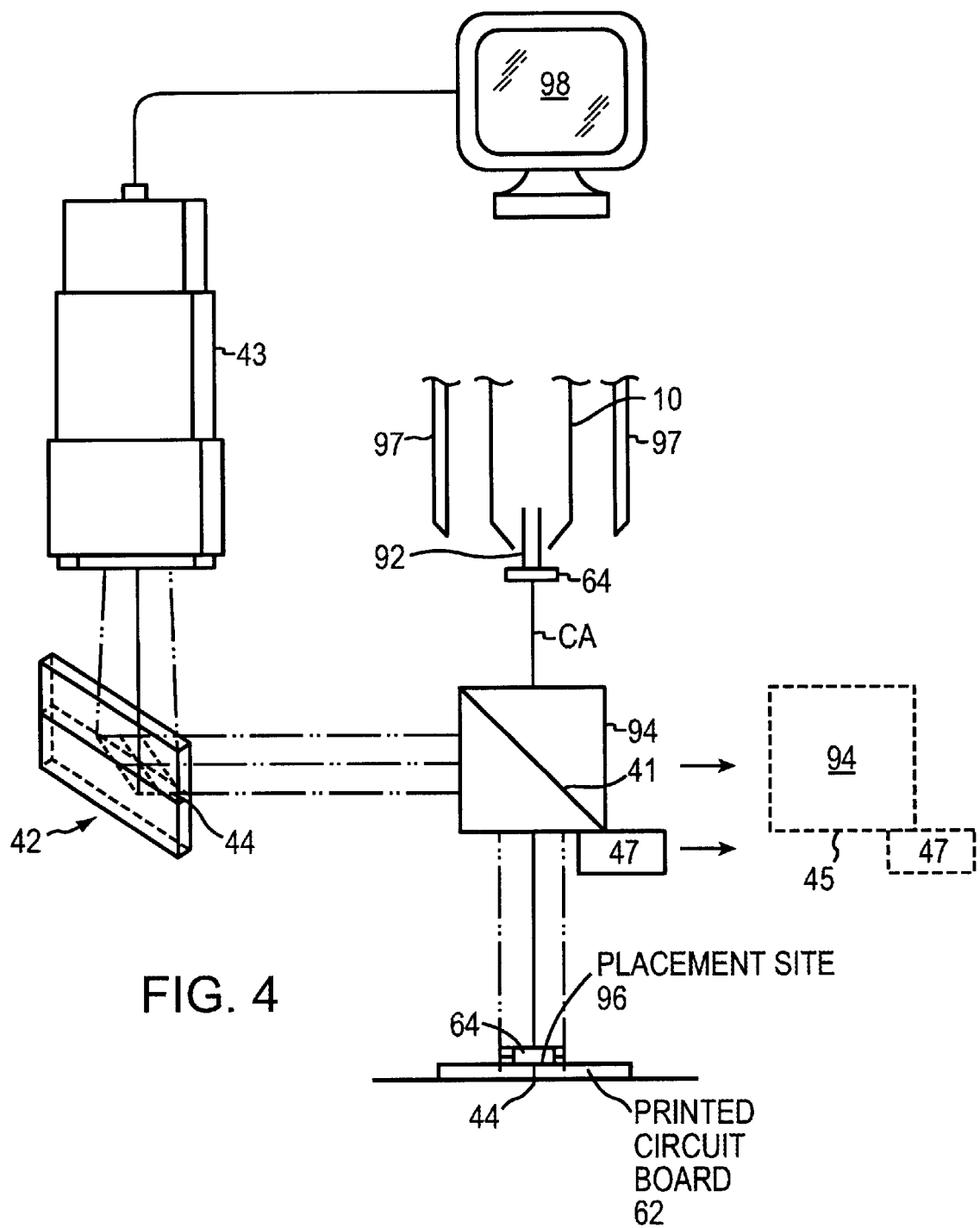
FIG. 4 is an pictorial representation of an optics alignment system used with the invention.

FIG. 4 is an illustration of an optics system that can be used to advantage with the present invention. With respect to FIG. 4, when placing a component 64 onto a placement site 96, the pick-up tube 10, the heating funnel tip 97 and the prism 94 are all independently controlled. The pick-up tube and the heater are co-axial on the axis CA and move up and down along the Z axis while the prism 94 is mounted on a shuttle 47 that moves the prism laterally from the alignment position to an out of the way position 45. When at position 45 the pick-up tube and the heater are free to move up and down along the CA axis.

The head 50 may be ball slide mounted in combination with the front of the cabinet 41 of the apparatus 40. An extension of the CA in the vertical direction defines a reference point 44 corresponding to the center of an IC site 96. The head 50 ends with the heating nozzle 37 with a square outlet where the component to be removed is a square IC. In this patent the square nozzle 37 is replaced with the micro-nozzle of FIG. 1A or FIG. 5. The square IC is aligned in the center of the round micro-nozzle by visually overlaying the center of the syringe needle tip and the component IC 64. The heating nozzle is then positioned over the component and the vacuum syringe is driven down close to the top of the IC. When the solder is liquid the syringe is driven down to contact and then lift the component away from the printed circuit board.

FIG. 4 is an optical acquisition and alignment system used to accurately position the component to be removed or replaced under the pick up syringe and the heating openings. For IC removal, the placement site 96 are both reflected via the prism cube 94 and the half-silvered mirror 41. The mirror 41 is tilted at forty-five degrees so that the image of the site 96 and component 64 are reflected to a mirror 42 along with an image of the pick up tip of the syringe needle 92. This allows the attributes of the component 64 and the site 96 to be viewed and aligned with respect to the pick up tip of the syringe needle 92.

When the pick-up tube with the syringe needle is up, along with the heater and nozzle assembly, and the prism 94 is in the position shown in FIG. 4, the optics system looks up and down along the CA axis at the same time. Images are displayed via a CCD camera 43 on monitor 98. After alignment of a component 64 held by the up pick-up tube and the syringe needle 92 (the up view) and the PCB site (the down view) is accomplished by adjusting in the X, Y and θ dimensions, the pick-up tube carrying the component is lowered to place the component on the site. The heater and nozzle assembly is then lowered to heat the component solder to reflow. In most cases, auxiliary bottom heating from below the PCB 62 is used as an aid to this heating process.

When the pick-up tube is to remove a component, the prism intersects the CA axis and the needle tip, in the up view, is aligned with the component 64 in position on the site 96, in the down view. The prism is moved out of the way to accommodate the removal.

FIG. 5 diagrammatically shows a system in which the nozzle funnel 72 is independent of the pickup tube 70 and needle 31. Here the pick up tube 70 extends and is connected to the syringe needle 31 by the Luer lock hub 76 of FIG. 2. A chimney hat 86 surrounds the tube and a retention spring 88 helps raise the chimney hat that surrounds the pick up tube when the tube is lifted away from the assembly. The chimney hat prevents the heat from escaping through the top of the assembly. The tube will be lifted away from the assembly when extracting defective components and/or lowered when returning with replacement components.

In this preferred embodiment, air enters via a heater cartridge 81. The air is forced under pressure down around and between the needle tip 31 and the Luer lock hub 76. The drawing shows the needle tip extended beyond the end of the housing and engaging a part 82. Prior to the needle being so extended, it is raised about one quarter of an inch relative to the end of the housing so that the hot air flows unrestricted out onto the defective part. Vent holes 90 may be used to vent some of the hot air when the needle is lowered, as shown. In this case a large portion of the hot air is vented via the holes 90 that are directed upward and away from adjacent components. This guards against the surrounding components being unduly heated where unwanted re-flowing of the adjacent components may occur.

FIG. 5 is a preferred embodiment where the pickup tube 70 moves vertically relative to the heating funnel 72. The tube 70 ends with a slightly tapered end 74 where the taper matches that of the Luer lock hub 76. The syringe needle 31 is attached to the Luer lock hub 76. Air is introduced via a duct 80 that encases a heating cartridge 81 that heats the air. The hot air is driven down the space between the funnel 72 and the syringe needle 31 out onto the soldered connections from the printed circuit board 84 and the component 82 being replaced. The optical aligning system is not shown for clarity. The syringe needle is shown lowered, but before being lowered the nozzle is in contact or near contact with the printed circuit board where the hot air is directed onto the soldered contacts. Excess air is vented through raised lateral holes to reduce the air heating the soldered contacts of adjacent components. The vacuum tip is then lowered contacting the component and, when the solder reflows, the component is lifted by the vacuum and needle 31. A new component is positioned on the vacuum and aligned to the pads on the printed circuit board. The nozzle is lowered to surround the new component on the board. The hot air reflows the solder thereby completing the replacement process. The funnel opening is configured to allow the component to pass through.

The chimney hat 86 is retained by the spring 88 when the tube and vacuum needle are removed away from the mounting plate 100.

What is claimed is:

1. A soldering/desoldering and pickup device for replacing miniature components soldered to a printed circuit board comprising:

a nozzle with an entrance through which heated gas enters and a second end, wherein the second end is shaped to vent and focus the heated gas onto the component and the component's soldered connections, a syringe needle wherein the hollow center is connected to a vacuum source at a distal end, and where the proximate end terminates with the hollow center opening arranged to intimately contact the component to be wherein the vacuum operates to secure the component to be replaced to the proximate end of the syringe needle, and means for removing the syringe needle with respect to the board and with respect to the heating nozzle, and a tube co-axialy encompassing the syringe needle, but where the tube is encompassed by the nozzle, wherein the tube and the shape of the nozzle adjacent to the second end of the nozzle are arranged to focus the heated gas onto the component to be repaired, and a Luer lock hub that joins the syringed needle to the tube that allows the needle to be replaced and that longitudinally aligns the needle and the tube.

2. The soldering/desoldering and pickup device as defined in claim 1 wherein the means for moving the syringe needle is arranged to position the proximate end of the syringe needle both before and beyond the second end of the nozzle, and wherein the syringe needle is approximately centered in the second end of the nozzle.

3. The soldering/desoldering and pickup device as defined in claim 1 further comprising a washer interferingly in contact with the inner surface of the nozzle and the outer surface of the tube.

4. The soldering/desoldering and pickup device as defined in claim 1 wherein the second end of the nozzle is large enough to accommodate a component fitting through the second end opening.

5. The soldering/desoldering and pickup device as defined in claim 1 wherein the second end of the nozzle has a transverse dimension of less than 0.25 inches, and where the syringe needle outside dimension is less than 0.05 inches.

6. The soldering/desoldering and pickup device as defined in claim 1 further comprising means for introducing heated gas through the first end and at rates that the heated gas exits the second end of the nozzle at less than five to more than fifty cubic feet per hour, and wherein the heated gas is helium, air or nitrogen.

7. The soldering/desoldering and pickup device as defined in claim 1 further comprising means for registering the defective component to be repaired and the soldering/desoldering device and for registering the replacement component with the location of the former defective component.

8. The soldering/desoldering and pick up device as defined in claim 1 further comprising a positive gas pressure applied to the component that releases the component from the syringe needle proximate end.

9. A soldering/desoldering and pickup device for replacing components soldered to a printed circuit board comprising:

a nozzle with an entrance through which heated gas enters and a second end, wherein the second end is shaped to vent and focus the heated gas onto the component to be repaired, a syringe needle wherein the hollow center is connected to a vacuum source at a distal end, and where the proximate end terminates with the hollow center opening arranged to intimately contact the component wherein the vacuum operates to secure the component to be repaired to the proximate end of the syringe needle, means for applying a positive gas pressure to the component that releases the component from the syringe needle proximate end, means for moving the syringe needle from before to beyond the end of the nozzle, a tube co-axially encompassing the syringe needle, but wherein the tube is encompassed by the nozzle, wherein the tube and the shape of the nozzle adjacent to the second end of the nozzle are arranged to focus the heated gas onto the component to be repaired and wherein the second end of the nozzle is large enough to accommodate the defective component fitting through the second end opening, a connection that joins the syringe needle to the tube that allows the needle to be replaced and that longitudinally aligns the needle and the tube, and means for aligning the defective component to be repaired and the soldering/desoldering device and for aligning the replacement component with the location of the former defective component.

10. The soldering/desoldering and pickup device as defined in claim 9 wherein the second end of the nozzle has a transverse dimension of less than 0.25 inches, and where the syringe needle outside dimension is less than 0.02 inches, and means for introducing heated gas through the first end and at a rates that the heated gas exits the second end of the nozzle at a rate from less than five to more than fifty cubic feet per hour, and wherein the heated gas is helium, air or nitrogen.

\* \* \* \* \*